United States Patent [19]
Moller et al.

[11] Patent Number: 5,949,275
[45] Date of Patent: Sep. 7, 1999

[54] DUAL OUTPUT VOLTAGE BOOST CIRCUIT

[75] Inventors: David Dale Moller, Westfield; Terrell Anderson, Carmel, both of Ind.

[73] Assignee: Delco Electronics Corp., Kokomo, Ind.

[21] Appl. No.: 08/848,855

[22] Filed: May 2, 1997

[51] Int. Cl.$^6$ ............................ H03K 7/162; G05F 1/10
[52] U.S. Cl. ......................... 327/536; 327/589; 327/537
[58] Field of Search ................................ 327/536, 537, 327/390, 589; 323/222; 363/80, 89, 91

[56]         References Cited

U.S. PATENT DOCUMENTS 5,491,455  2/1996  Moller ..................................... 327/540
5,614,812  3/1997  Wagoner ................................. 323/222
5,677,617  10/1997 Tokai ...................................... 323/222
5,705,948  1/1998  Moller .................................... 327/589
5,744,943  4/1998  Tokai ...................................... 323/282

*Primary Examiner*—Terry D. Cunningham
*Assistant Examiner*—Maria Hasanzadah
*Attorney, Agent, or Firm*—Jimmy L. Funke

[57]          ABSTRACT

A voltage boost circuit having dual voltage outputs and a single input receives a DC voltage from an external source. The input voltage is boosted to provide a constant voltage at the first output at a level higher than the voltage input and to provide a constant voltage output at the second output. A switch is coupled to the output of the inductor for controlling the current flow to the second output.

8 Claims, 3 Drawing Sheets

DUAL OUTPUT VOLTAGE BOOST CIRCUIT

BACKGROUND OF THE INVENTION

The invention relates in general to a voltage boost circuit, and more particularly, to a voltage boost circuit having a single inductor. The voltage boost circuit provides a regulated constant first output at a potential above the supply voltage and a regulated constant second output.

Various voltage boosting systems are known for outputting constant raised voltages from fluctuating input voltages. Such systems have been used in automotive electronics applications. For the past several years, the number of electronics devices in automobiles has increased rapidly as vehicles have become more sophisticated. In many instances electronic devices that were not available several years ago are standard equipment in current automobiles. Much of this new equipment is computer controlled and requires energization from regulated constant voltage.

Automobiles have "body computers" for controlling items such as lamps, automatic door locks, windows, and the like. Computers are also necessary for many dashboard components, such as trip computers and other digital display devices. It is known, however, that the majority of these devices requires their own particular voltage levels for proper operation.

Typically, motor vehicles utilize a 12-volt storage batteries while providing battery voltages between 9 volts and 12.5 volts. However, automobile batteries are generally unable to provide constant voltages during different operating conditions. Large current draw devices, such as the starter, may cause the battery voltage to drop as low as 4.5 volts during a cold-crank start. The battery voltage may range as high as 35 volts during other transient conditions. Because of these wide voltage fluctuations such unregulated battery power is unsuitable for the voltage critical applications as described above.

A known voltage boost circuit comprises an inductor coupled to receive an input battery voltage which causes an inductor current to flow. From time to time the inductor current is interrupted by a switch thereby inducing an inductor voltage greater than the input battery voltage. Current pulses resulting from the switching incrementally charge a capacitor to a desired output voltage, at which point the switching is suspended. As current is drawn from the capacitor further inductor current pulses are generated by operating the switch at a fixed frequency, which generally allows each pulse of inductor current to decay to zero before the switch is closed.

In operation, the pulses are generated using a 50% duty cycle internal pulse generator that is enabled when the battery potential goes below a certain voltage level, typically 9 volts. At that point, the inductor is modulated at 50% so that the output voltage is regulated at 9 volts or is boosted to a higher voltage. Unfortunately, such known voltage boost circuits have relatively low switching frequencies. This results in the need for relatively very large and expensive inductors having inductance in the range of approximately 300 microhenries to 400 microhenries, to provide the appropriate current and voltage levels and to prevent the output current from decaying to zero before the switch switches and the current can be built back up. Therefore such large inductors are necessary to maintain the appropriate amount of current flow to the output for an extended period of time between switching in order to prevent the capacitor output voltage from dropping below its required level. A further disadvantage of these prior voltage boost circuits is that their output voltages are regulated by "dropping" current-providing cycles in order to avoid exceeding a preselected output voltage. The cycles are dropped by stopping switch cycling. This causes a quasi-DC current to flow through the inductor. The quasi-DC current is limited primarily by the internal resistance of the battery and the resistance of the inductor itself. The result is a large current draw which wastes current and may overheat the circuit. However, as can be seen, this results in a waste of current and a voltage boost circuit that generates excessive heat from constantly being on. A further disadvantage in these prior voltage boost circuits is that while multiple outputs are available, the voltage boost circuits are unable to provide different amounts of voltage on each output and accordingly also do not automatically vary the amounts of current provided to each of the outputs.

Prior voltage boost circuits also have the disadvantage of using voltage comparators to enable or disable the boost circuitry. As such, because of the absence of hysteresis on these voltage comparators, a significant amount of noise from electromagnetic interference (EMI) is generated when the boost circuitry is switched on and off. The noise is generated by the jitter caused in the circuit due to the fairly rapid switching of the voltage boost circuit, and may in turn cause noise to be heard on the car radio and other radio frequency type devices.

SUMMARY OF THE INVENTION

A voltage boost circuit for receiving a variable DC voltage at a first DC voltage level for providing a source of DC current and providing two constant output DC voltages, wherein the first output is at a voltage level higher than the input level and the second output is at a voltage level lower than the first output voltage, is disclosed herein. The voltage boost circuit includes a small value inductor, such as a surface mount inductor, for inducing relatively small currents. A current steering switch is coupled to the inductor and is used to control the amount of current flow from the inductor to the second output. A transistor switch is coupled to the inductor and is responsive to an inductor cycling switch. The inductor cycling switch is used to control the amount of current flow from the inductor to the outputs. A dual state switch that cycles with the inductor cycling switch turns the current steering switch on and off to alternate current flow between the first and second outputs when both first and second outputs are below their desired values. The outputs are charge storing devices, such as output load capacitors that are connected from a boost point to the ground.

The inductor cycling switch is repeatedly turned on and off to cause current to flow through the inductor and the transistor switch. Once the current reaches a particular level, the inductor cycling switch is turned off and the current flows to the output load capacitor. The output load capacitor is selected by a logic circuit, depending upon the output requiring current. This process continues until the voltage at the output load capacitors are at their desired values. Because the inductor cycling switch operates at a relatively fast speed and thereby prevents the current from dropping to zero, a smaller value inductor may be used. As such, the inductor is required to carry far less current than a larger value inductor.

Comparators connected to the boost points sense the voltages at the outputs and disable the inductor cycling switch when the voltages at the boost points exceed their respective threshold values. Similarly, the inductor cycling switch is enabled when the voltages at the boost points fall below their respective threshold values. By closely monitoring the output boost voltages, the loads connected to the output load capacitors are guaranteed to not receive an excessive amount of current.

It is an object of the present invention to solve various problems of the prior art.

It is yet another object of the present invention to provide a single input/multiple output voltage boosting circuit for supplying constant and/or boosted voltage to several components simultaneously.

It is yet another object of the present invention to provide multiple voltage outputs that may be at different voltage levels.

It is yet another object of the present invention to protect the loads by limiting excess current available at the voltage outputs.

It is yet another object of the present invention to decrease the size and cost of the voltage boost circuit.

It is yet another object of the present invention to decrease the amount of noise generated by the activation and deactivation of the voltage boost circuit.

It is yet another object of the present invention to prevent overheating of the circuit by becoming inactive when proper output voltages are available at the voltage outputs.

It is yet another object of the present invention to use a relatively smaller value inductor to provide boosted voltage.

DETAILED DESCRIPTION OF THE PREFERRED EMBODIMENT

The present invention relates to a voltage boost circuit having a single input and two voltage outputs. Each of the outputs are at a different voltage level in order to provide voltage to different devices which require differing amounts of voltage. In particular, one of the voltage outputs is at a voltage level higher than the input voltage. An intelligent steering switch is used to automatically control the current flow to the second voltage output and a dual state switch is used to alternate current flow between both voltage outputs. The voltage boost circuit is enabled in those instances when the voltages at the outputs are below their respective maximum threshold values.

In order to enable use of the smallest and least costly input inductor, a surface mount type inductor is used. Because the inductor is a surface mount type device, the induced current in such an inductor is relatively small compared to the large lead type inductors previously used as mentioned above. Accordingly, the inductor used in this invention is used in such an efficient manner as to utilize practically all the available current that the inductor can provide. Thus, the inductor size contemplated in this invention may be as small as 50 $\mu$H to 100 $\mu$H and yet still provide the necessary amount of current for proper operation of the devices connected to the outputs. In addition, because of the small size of the inductor, relatively fast switching is also utilized to prevent the current output from decaying to zero, thereby making efficient use of each switch cycle to provide the needed current.

A further advantage of using a small inductor is the minimization of heat generated by the voltage boost circuit. Because the circuit is intended to be housed in an enclosure protecting it from the elements, it is desirable that the circuit generate as little heat as possible to prevent thermal problems.

Another advantage of the present invention is the ability to monitor the voltage available at the outputs and to supply current to only those outputs that require boosted voltage levels. This enables each current cycle to be used where it is needed, without wasting current on outputs that are already at their appropriate levels.

Another advantage of the present invention is that the voltage boost circuit will disengage when the voltage outputs are at their appropriate levels, thereby preventing overheating of the circuit.

The boost circuit, other than for the surface mount inductor and surface mount output load capacitors, is designed to be implemented in silicon and surface mounted along with the inductor and capacitors. This results in the smallest possible circuit at the least cost. Furthermore, Schmitt triggers may be used to switch the circuit on and off only at appropriate voltage levels to decrease unwanted noise and other electrical emissions.

Figure 1:
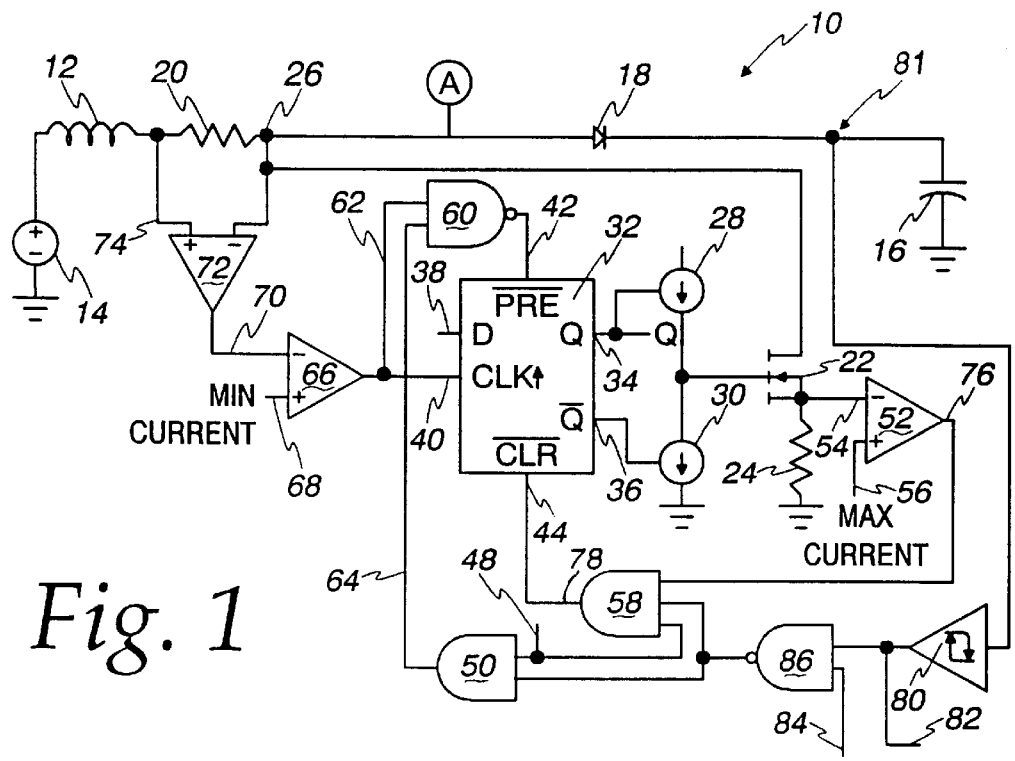
FIG. 1 is a schematic diagram of a voltage boost power supply embodying the present invention.
Figures 2, 3:
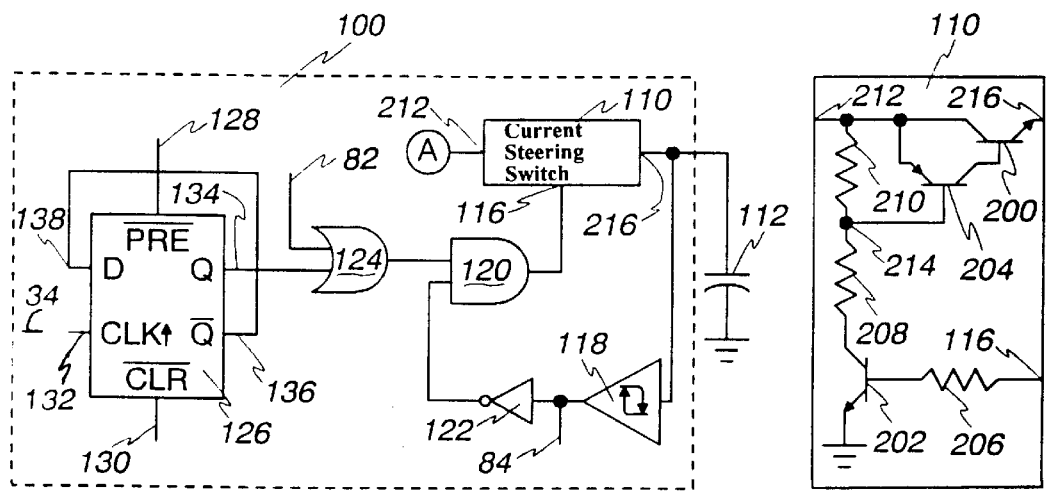
FIG. 2 is a schematic diagram of a steering circuit for directing current to a second output.
FIG. 3 is a schematic diagram of the switch used in the steering circuit.

Referring to the embodiment illustrated in FIGS. 1 and 2, a dual state switch is used to provide boosted voltages at two output charge capacitors from a single inductor having a voltage input. In particular, switcher circuit, generally indicated by numeral 10, and output steering circuit, generally indicated by numeral 100, are cross-connected and comprise what is the complete voltage boost circuit of the present invention. Signals EN1 82 and EN2 84 (FIG. 1) are connected to their respective signal lines on FIG. 2. The switcher circuit 10 includes that portion of the circuit having a first output charge storing device, such as a capacitor 16 (FIG. 1), and the output steering circuit 100 includes that portion of the circuit showing a second charge storing device, such as output load capacitor 112 (FIG. 2). Further referring to FIG. 2, voltage-in (VIN) 212 of output steering switch 110 is connected at a junction point 26 of switcher circuit 10 (FIG. 1) for enabling the voltage boost circuit to automatically steer current to the particular output charge storing device that will provide the boosted voltage.

As mentioned above, switcher circuit 10 and output steering circuit 100 shows a voltage boost circuit having a single inductor 12 at its input and the two capacitors 16 and 112 for providing voltage at the voltage outputs. An inductor cycling switch 32 is coupled to the field-effect-transistor 22 to control the current flow from the inductor 12 to the output load capacitors 16 and 112. As shown in FIG. 2, output steering circuit 100 is used for selectively enabling the availability of a boosted voltage at the second output load capacitor 112. The output steering circuit 100 includes the output steering switch 110, that when closed, provides a low impedance path for selecting current from the inductor 12 to be provided to the second output load capacitor 112. A dual state switch 126 is also included to provide current to each of the two output load capacitors 16 and 112 on alternating cycles when a particular boost mode is enabled.

The switcher circuit 10, as shown in FIG. 1, receives a DC input voltage from the automobile battery 14 and provides a constant output voltage at a first output load capacitor 16, either boosted or unboosted, depending on whether the voltage boost circuit is enabled. The output voltage available at output load capacitor 16 is required to be at a constant voltage. However, small fluctuations of up to several hundred millivolts are also acceptable.

Power input to the voltage boost circuit as shown in FIGS. 1 and 2 for use, for example, in automotive applications is supplied by a standard vehicle battery having 12 volts nominal voltage. The output potential of the switcher circuit 10 is intended to be 22.8 volts at the first output load capacitor 16, and 9 volts at the second output load capacitor 112. The available output voltages may properly be measured at points 81 (FIG. 1) and 216 (FIG. 2). While the outputs of the switcher circuit 10 may be at any desired voltage, for proper operation, the voltage provided at the second output load capacitor 112 must be at a lower level than the voltage available at the first output load capacitor 16. This allows for enabling a boosted output at the second output load capacitor 112 by way of a low impedance path which is formed in output steering switch 110 when the output steering switch 110 is closed. As such, simply closing and opening the output steering switch 110 controls whether the second output load capacitor 112 will receive current.

The first output load capacitor 16 is coupled by a steering diode 18 to the switcher circuit 10. The steering diode 18 functions as a blocking diode to prevent current backflow into the output steering circuit 100 via the low impedance path of output steering switch 110 when the second output load capacitor 112 is receiving current. The second output load capacitor 112 is coupled by the output steering switch 110 to the charging circuit. The voltage boost circuit includes a charging circuit that includes the vehicle battery input 14, which is connected to an inductor 12, a first current sensing resistor 20, a switching transistor, such as field effect transistor (FET) 22 and a second current sensing resistor 24, all in series. The steering diode 18 is connected to the junction 26 of the first current resistor 20 and the FET 22. The FET 22, as done in classic power boost circuits, is repeatedly turned on and off to cause current to flow through the inductor 12 and the FET 22. Once a certain amount of current is detected flowing through FET 22, the FET 22 is turned off. At that point, the current is forced to flow through to one or both of the output load capacitors 16, 112. This process is repeated as necessary to maintain the proper voltage levels at the output load capacitors 16 and 112.

The particular type of inductor 12 used in this invention is, as mentioned above, generally a small, surface mount type component. In addition, the inductor 12 is chosen such that it is of the smallest value possible to provide the necessary amounts of current. As such, the inductor 12 is selected by assessing the amount of current that will be drawn at the output load capacitors 16 and 112 and then back calculating the value of the inductor. Because the inductor 12 is used as efficiently as possible by using all its available current, the value of the inductor 12 may be ⅓ to ½ the value of typically used, thereby enabling use of a surface mount component. As mentioned above, this results in significantly less heat being generated by the circuit relative to known voltage boost circuits.

The FET 22 is controlled by a current source 28 that provides the current to the FET 22 necessary to turn the FET 22 on. Current source 28 is required because the amount of current required to turn FET 22 on is much greater than can be supplied by digital devices. Preferably, the current source 28 is connected to the highest potential in the system, such as the boost point 81, to minimize losses in the system. Similarly, a current sink 30 is provided to turn FET 22 off by preventing current from activating FET 22. The current sink 30 and current source 28 are controlled by an inductor cycling switch 32, which may be a D-type flip-flop. In this case, the Q output 34 of the inductor cycling switch 32 controls the current source 28 and the OVERLINE Q output 36 controls the current sink 30. The data input (D) 38 of the inductor cycling switch 32 is coupled to a regulated voltage Vcc (not shown), so that a high-going signal on the clock input 40 of the inductor cycling switch 32 will cause Q output 34 of the inductor cycling switch 32 to output a logic "1" and OVERLINE Q 36 to output a logic "0". A low-going signal on the clock input 40 of the inductor cycling switch 32 will cause the inductor cycling switch 32 to become inert and maintain its state on its Q output 34, which, in this particular case, is a logic "1". As further explained below, this will cause the Q output 34 to output a logic "0" and OVERLINE Q output 36 to output a logic "1". Depending upon the clock signal 40 into the inductor cycling switch 32, the FET 22 will therefore either open or close. In addition, a logic "0" into the preset ("pre*") input 42 of the inductor cycling switch 32 will set the Q output 34 to logic "1". Similarly, a logic "0" into the clear ("clr*") input 44 of the inductor cycling switch 32 will set the Q output 34 to logic "0". As shown, in all instances the Q output 34 and OVERLINE Q output 36 will be logical opposites.

The voltage boost circuit starts itself when the output voltage at the first output load capacitor 16 or at the second output load capacitor 112 falls below its predetermined threshold value and when signal ENAB 48 into AND gate 50 is a logic "1". Furthermore, the voltage boost circuit operates in a continuous mode of operation, wherein the inductor 12 current is always greater than zero and the maximum amount of booster current is always available. Signal ENAB 48 is simply a power supply stabilization signal from another part of the system (not shown) that indicates that the system has stabilized and is ready for operation. The voltage boost circuit stops itself when the output voltages reach their appropriate levels. As mentioned above, the minimum current comparator 66 and the maximum current comparator 52 are used to set threshold levels for the voltage boost circuit. In particular, by setting a minimum current threshold, the current output from the voltage boost circuit is guaranteed to always be in a continuous mode of operation wherein the current available at the outputs 16 and 112 never drop to zero. In addition, the maximum current threshold level assures that the current available at the outputs 16 and 112 do not exceed a predetermined threshold value, generally the voltage necessary for proper operation of the load devices. This results in reduced heat in the circuit and reduced current draw from the inductor 12, which is particularly important because the inductor 12 core should not be allowed to saturate. Operating beyond the saturation point could cause thermal problems because of DC flowing through the inductor 12 when the inductor 12 core is saturated.

The FET 22 is turned off by the maximum current comparator 52 when the current exceeds a predetermined threshold. In particular, inverting input 54 is coupled to a second current sense resistor 24. The other input 56 (non-inverting) of the maximum current comparator 52 is connected to a reference voltage, which indicates the predetermined maximum amount of current that the inductor 12 will produce. The output from the maximum current comparator 52 is then coupled to the clr* input 44 of the inductor cycling switch 32 by way of AND gate 58. Therefore, if the FET 22 is conducting, and as the current in the inductor increases and exceeds the maximum reference current, the maximum current comparator 52 output will go to a logic "0". Accordingly, the AND gate 58 output will be logic "0", thereby causing the inductor cycling switch 32 to clear. As mentioned above, this will cause the OVERLINE Q output 36 of the inductor cycling switch 32 to a logic "1", thereby enabling current sink 30 and causing FET 22 to turn off. Thus, the inductor cycling switch 32 is preset when the output of NAND gate 60 is a logic "0". Such a condition will occur only when inputs 62 and 64 into NAND gate 60 are logic "1". One of the NAND gate 60 inputs, in particular, the output from minimum current comparator 66, will be a logic "1", when current through the inductor 12 has not increased beyond a certain minimum threshold. As shown, the non-inverting input 68 of the minimum current comparator 66 is connected to a reference voltage for establishing the minimum amount of current that inductor 12 will produce. The inverting input 70 of the minimum current comparator 66 is connected to the output of converting comparator 72. Converting comparator 72 simply acts as a current and voltage converting circuit that tracks the current level flowing through the first current-sensing resistor 20 and feeds the result into the non-inverting input 70 of minimum current comparator 66. Therefore, until the current through the inductor 12 causes first current sensing resistor 20 to exceed the threshold voltage level set by the reference voltage into minimum current comparator 66, the output of minimum current comparator 66 will be a logic "1". Because both the inputs into NAND gate 60 are a logic "1", the output of NAND gate 60 into the pre* input 42 of the inductor cycling switch 32 will be a logic "0". As a result, the inductor cycling switch 32 will "set", causing the Q output 34 of the inductor cycling switch 32 to be a logic "1", and the OVERLINE Q output 36 to be a logic "0", thereby enabling the current source 28 and disabling the current sink 30, respectively. Thus, FET 22 will turn on. This condition will exist until the minimum current threshold is exceeded, at which time the minimum current comparator 66 will output a logic "0". As a result, the clock input 40 to the inductor cycling switch 32 will go "low", thereby causing the inductor cycling switch 32 to become inert, and will stop actively forcing a logic "1", at the Q output of the inductor cycling switch 32. At this point, however, the Q output will remain a logic "1" and will maintain the FET 22 in an "on" state.

As inductor 12 current increases (monitored by current sense resistor 20) the current will increase past the threshold value set by the minimum current comparator 66. As the current continues to increase and flows through FET 22, the current level will increase beyond the threshold level set by maximum current comparator 52 (as measured by second current sense resistor 24) and will cause a logic "0" at the output of the comparator 52. This, in turn, will cause a logic "1" at the output of AND gate 58. Because the clock input 40 of the inductor cycling switch 32 had already been turned "off" by the minimum current comparator 66, the inductor cycling switch 32 will cause the inductor cycling switch 32 to clear, thereby enabling current sink 30 and disabling current source 28. Accordingly, this will switch FET 22 off and will cause the output 76 of the maximum current comparator 52 and the output 78 of AND gate 58 to a logic "1", thereby releasing the clr* input 44 of inductor cycling switch 32. At this point, the current flowing in the inductor 12 decreases and begins to flow through either steering diode 18 into first output load capacitor 16, or through an output steering switch 110 into second output load capacitor 112. The current flow through the inductor 12 is measured by first current sense resistor 20. Once the current decreases below the threshold limit set by minimum current comparator 66, the output of minimum current comparator 66 will become a logic "1". The logic "1" output of the minimum current comparator 66 (which is connected to the clock input 40 of the inductor cycling switch 32) will act as a rising edge and will, once again, set inductor cycling switch 32. In addition, since the output of AND gate 58 and minimum current comparator 66 are a logic "1", the output of NAND gate 60 will be a logic "0". In normal operation, this would cause inductor cycling switch 32 to set. However, since in this case inductor cycling switch 32 has already been set, NAND gate 60 will have no effect on the inductor cycling switch 32, thereby remaining in a continuous mode of operation, wherein the inductor 12 current is always greater than zero and the maximum amount of booster output current is always available. The voltage boosting continues until the voltage outputs at first output load capacitor 16 and second output load capacitor 112 exceed their respective threshold values or ENAB 48 goes "low". The voltage boost circuit will re-enable once the starting conditions described above are again met, e.g., the voltage at output load capacitor 16 or output load capacitor 112 is below its respective threshold value and if ENAB 48 is high.

Referring to FIG. 3, output steering switch 110 is shown, which is required to implement this particular boosting scheme. In particular, output steering switch 110 provides a low impedance path to enable current flow for boosting voltage at second output load capacitor 112. In one embodiment, the output steering switch 110 is a complementary bipolar switch having two NPN bipolar transistors 200 and 202, and one PNP bipolar transistor 204. While other transistor configurations may be used, the particular embodiment shown in the figure provides an efficient low-loss switching mechanism wherein only a few milliamps of current are needed to operate the switch. Thus, the switch 110 operates very efficiently and wastes little current. It should be noted that the output steering switch 110 may also be implemented using P-channel logic.

The switch-enable (SWEN) 116 logic level signal is connected to the base of transistor 202 through base current-limiting resistor 206. Two resistors 208 and 210 are connected in series from the collector of transistor 202 to the input voltage (VIN) 212. The base of transistor 204 is connected to the junction 214 of resistors 208 and 210, and the collector of transistor 204 is connected to the base of transistor 200. The emitter of transistor 204 and the collector of transistor 200 (as well as resistor 210) are connected to VIN 212. The emitter of transistor 200 provides the output voltage (VOUT) 216. Thus, when SWEN 116 is a logic "1", transistor 202 will saturate and cause current to flow through resistors 208 and 210. Once the emitter to base voltage of transistor 204 is 0.7 VDC, transistor 204 will turn on and saturate, thereby causing the collector current of transistor 204 to flow into the base of transistor 200 and further causing transistor 200 to turn on. Therefore, current will flow from VIN 212 to VOUT 216.

When SWEN 116 of the output steering switch 110 is a logic "0", that is, the switch is turned off, transistor 202 will cut off and current will stop flowing through resistor 208, resistor 210, transistor 204 and transistor 200. As such, current flow to second output load capacitor 112 will no longer occur. In addition, when SWEN 116 is a logic "0", current will not flow through transistor 204 or 200 when VIN 212 is larger than VOUT 216. When SWEN 116 is a logic "1", current will only flow through transistor 204 and 200 when VIN 212 is larger than VOUT 216. Backwards current flow from VOUT 216 to VIN 212 is prevented when FET 22 is enabled by designing the base-to-emitter breakdown voltage of transistor 200 to be above VOUT 216 operating voltage.

Referring to FIG. 2, output steering circuit 100 is used to determine the particular boost sequence necessary for proper operation. In particular, the highest potential boosted voltage will preferably have just a single steering diode 18 connected between the input inductor 12 and output load capacitor 16. The lower potential boosted voltage will have a low impedance output steering switch 110 connected between the input inductor 12 and its output load capacitor 112. The dual state switch 126 is used to provide current on alternating cycles to each of the output load capacitors 16 and 112 if boosting is necessary at both outputs.

The steering logic is generally selected by first and second comparators 80 and 118. Schmitt triggers may be used for the comparators to take advantage of the hysteresis inherent in such devices. Because the present invention is able to tolerate up to several hundred millivolts of hysteresis, use of the Schmitt triggers to enable voltage boost will result in significantly reduced EMI and other electrical noise. As such, each comparator 80, 118 is set at the voltage level that is to be presented at each of the output 16, 112. Depending upon the voltage levels at first output load capacitor 16 and second output load capacitor 112 in relation to the threshold values set by the first and second comparators 80 and 118, current will be supplied to the appropriate output load capacitors. The first and second comparators 80 and 118 protect the circuit from overcharging. In particular, once the output voltages at the outputs 16, 112 exceed the threshold levels set by the comparators 80 and 118, the boosting function of the voltage boost circuit is disabled.

Figure 4:
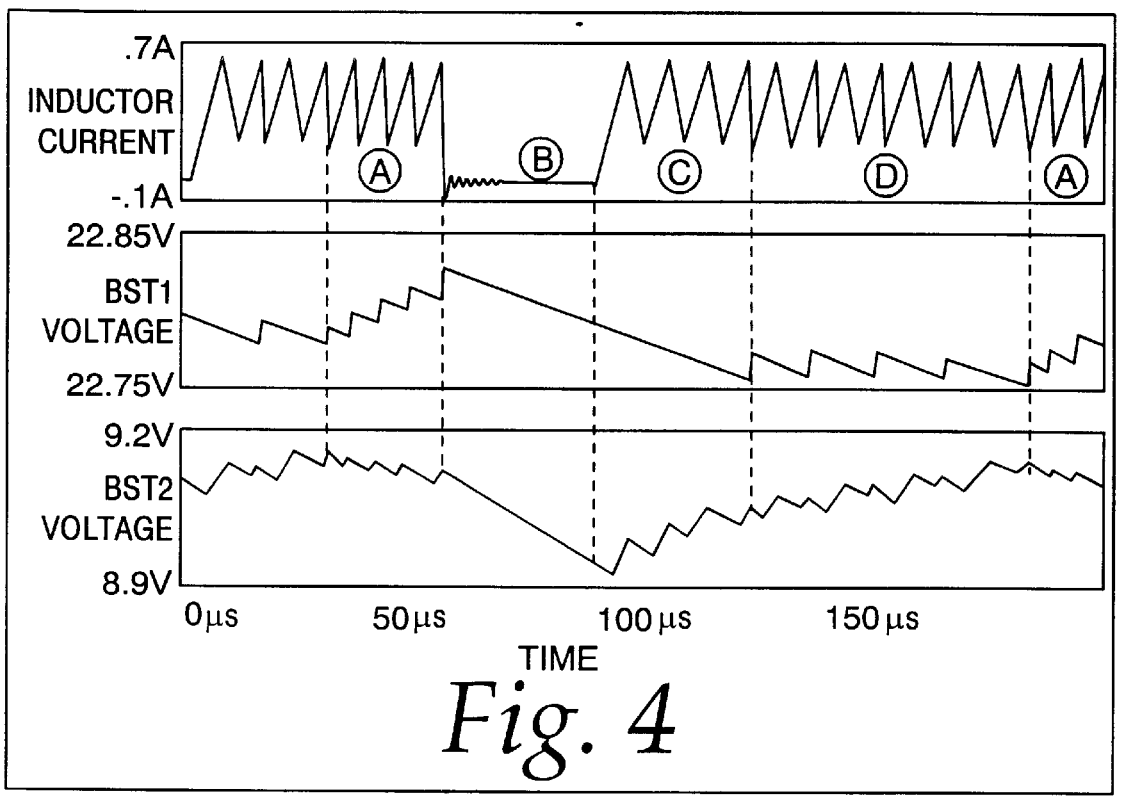
FIG. 4 is a waveform diagram illustrating an overview of the circuit in operation.
Figure 5:
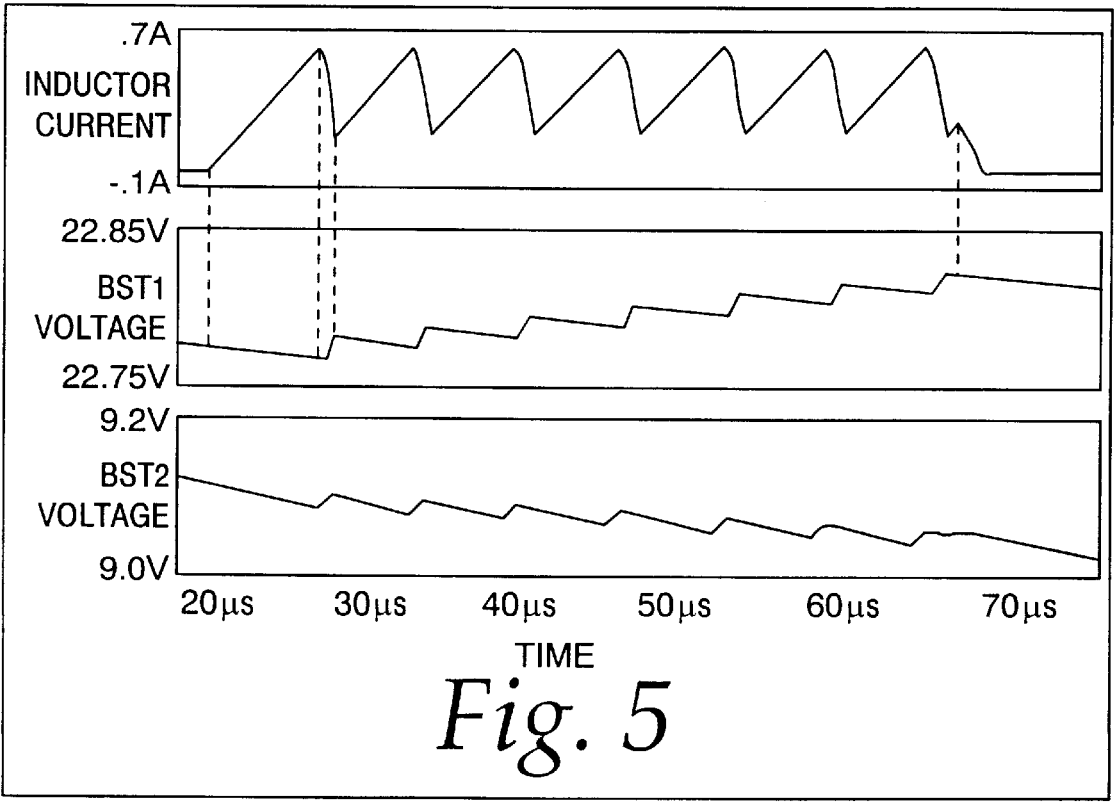
FIG. 5 is a waveform diagram illustrating circuit operation in a first enabled mode of operation wherein the higher voltage output is in a boosted mode of operation.
Figure 6:
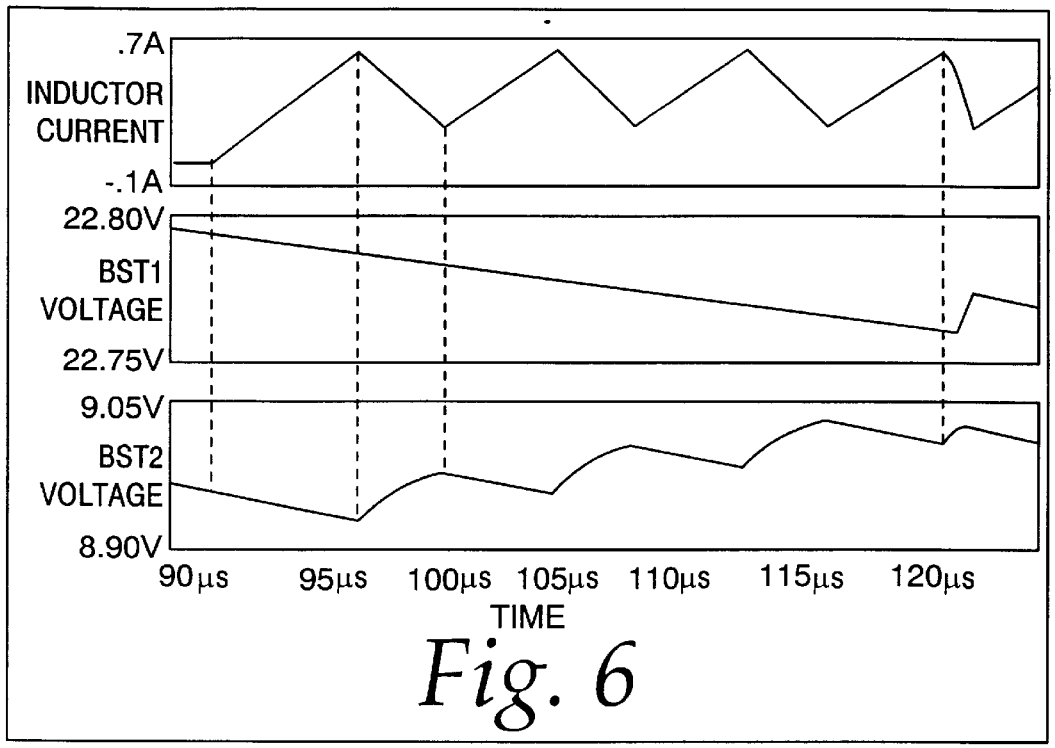
FIG. 6 is a waveform diagram illustrating circuit operation in a second enabled mode of operation wherein the lower voltage output is in a boosted mode of operation.
Figure 7:
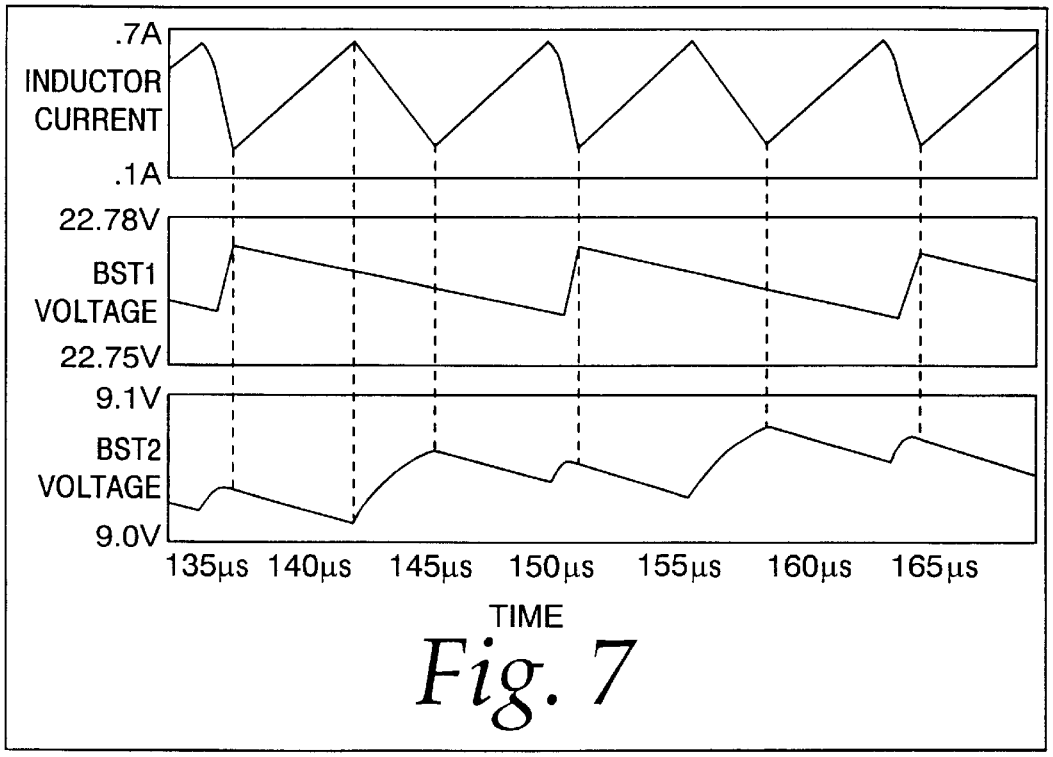
FIG. 7 is a waveform diagram illustrating circuit operation in a third enabled mode of operation wherein both voltage outputs are operating in a boosted mode of operation.

In the embodiment described herein, four different operating modes are contemplated. An overview of the voltage boost circuit in operation is shown in FIG. 4. In a non-boost mode, the voltage at the first and second output load capacitors 16 and 112 are at their appropriate levels and therefore require no boosting. FIG. 5 illustrates a first mode, wherein first output load capacitor 16 is the only output below its threshold value, and therefore requires service. FIG. 6 illustrates a second mode, wherein second output load capacitor 112 is the only output below its threshold value, and therefore requires service. FIG. 7 illustrates the third mode of operation, wherein both output load capacitors 16 and 112 are below their respective threshold values, and therefore each requires service.

In the non-boost mode (FIG. 4, region B), voltage boosting is disabled, since both output load capacitors 16 and 112 are above the threshold limit set by first and second comparators 80 and 118, and therefore the outputs of the comparators 80 and 118 will be a logic "1". Accordingly, signals EN1 82 and EN2 84 will also be a logic "1". This causes NAND gate 86 and AND gate 120 to have logic "0" outputs as well. Therefore, inductor cycling switch 32 will clear, thereby disabling the voltage boost circuit. Similarly, SWEN 116 will also remain disabled. As shown in the figure, since no current is supplied to the output load capacitors 16 and 112, the voltage levels (as measured at points 81 (Bst1) and 216 (Bst2)) do not receive any current pulses and start decaying to their minimum allowable levels.

In the first mode (FIG. 5 and FIG. 4, region A), once first output load capacitor 16 falls below its threshold value, the voltage boost circuit will activate and boost the voltage available at the first output load capacitor 16 and first comparator 80 will have a logic "0" at its output. Second comparator 118, since it does not need service, will have a logic "1", at its output, and will cause signal EN2 84 to be a logic "1". Accordingly, the output of invertor 122 will be at logic "0", thereby causing the output of AND gate 120 to be a logic "0". As such, output steering switch 110 will remain off and second output load capacitor 112 will not be serviced. First output load capacitor 16, on the other hand, will receive every current pulse from the voltage boost circuit until the predetermined threshold voltage is exceeded. As more particularly shown in the figures, the voltage level at the first output load capacitor 16 (Bst1) receives every pulse of current and begins to rise to its maximum allowed voltage level. The second output does not receive any current and therefore begins to fall towards its minimum allowable level (Bst2).

In the second mode (FIG. 6 and FIG. 4, region C), once second output load capacitor 112 falls below its threshold value, the voltage boost circuit will activate and second comparator 118 will have a logic "0" at its output. First comparator 80 will have a logic "1" at its output, since first output load capacitor 16 is above its threshold value. Similarly, signal EN1 82 will be a logic "1", and signal EN2 84 will be a logic "0". Thus, the outputs of OR gate 124 and inverter 122 will be a logic "1", making the output of AND gate 120 a logic "1" and thereby enabling the output steering switch 110. Since the voltage set point of second output load capacitor 112 is below first output load capacitor 16, every current pulse will supply current by way of the low impedance output steering switch 110 to the second output load capacitor 112 only. In addition, the steering diode 18 is back-biased during this time to prevent backflow of current from voltage output 16 to voltage output 112. As more particularly shown in the figure, the voltage level at the second output requires boosting and therefore receives every pulse of current. The voltage level then begins to rise to its maximum allowed limit (Bst2). The first output load capacitor 16 does not receive any current and therefore begins to fall towards its minimum allowable level (Bst1).

In the third mode (FIG. 7 and FIG. 4, region D), once both output load capacitors 16 and 112 fall below their respective threshold levels, the voltage boost circuit will activate and first and second comparators 80 and 118 will output logic "0". Thus, signals EN1 82 and EN2 84 will likewise be a logic "0". As such, the output of invertor 122 will be a logic "1", and the output of OR gate 124 will follow the Q output 134 of the dual state switch 126. A D-type flip-flop may be used for dual state switch 126. As shown, dual state switch 126 has its preset input 128 and its clear input 130 tied to $V_{CC}$ (logic "1"), thereby disabling these functions. Furthermore, the clock input 132 of the dual state switch 126 is provided by the Q output 34 of inductor cycling switch 32 and the OVERLINE Q output 136 of the dual state switch 126 is routed to its D-input 138. Thus, the Q output 134 and OVERLINE Q output 136 of dual state switch 126 toggle every time a switch cycle is initiated, which occurs during the rising edge of Q output 34 of inductor cycling switch 32. This enables and disables the output steering switch 110 on alternating cycles.

When the Q output 134 of dual state switch 126 is a logic "0", OR gate 124 and AND gate 120 will go to logic "0", thereby disabling output steering switch 110. Accordingly, first output load capacitor 16 will receive the current pulse.

When the Q output 34 of dual state switch 126 is a logic "1", OR gate 124 and AND gate 120 will go to logic "1", thereby enabling output steering switch 110. Accordingly, second output load capacitor 112 will then receive the current pulse. Thus, first output load capacitor 16 and second output load capacitor 112 get every second current pulse. As more particularly shown in the figures, the voltage levels at the first and second outputs require boosting. To service both outputs, the dual state switch 126 allows current to flow to the appropriate output. Accordingly, output load capacitors 16 and 112 receive every second current pulse until boosting is no longer required.

It can be seen that the voltage boost circuit of the present invention provides two voltage-regulated outputs at first and second capacitors 16 and 112 at different voltage levels, using only a single input inductor 12. The inductor 12 is sized such that a relatively smaller sized surface-mount type inductor may be used in the voltage boost circuit to minimize the cost and size of the voltage boost circuit. Furthermore, the current flow in the core of the inductor 12 is limited to prevent saturation.

Obviously, many modifications and variations of the present invention are possible in light of the above teachings. Thus, it is to be understood that, within the scope of the appended claims, the invention may be practiced otherwise than as specifically described above.

What is claimed is:

1. A dual output voltage boost circuit connected to a direct current source having a predetermined input voltage, comprising:

an inductor;

a transistor for electrically coupling said inductor to the direct current source;

a first charge storing device for providing a first predetermined output voltage which is higher than said predetermined input voltage;

a second charge storing device for providing a second predetermined output voltage which is lower than said first predetermined output voltage;

a steering diode coupling the inductor to said first charge storing device;

a controlled steering switch having on and off states coupling the inductor to said second charge storing device;

an inductor cycling switch connected to control said transistor; means connected to said inductor cycling switch for causing said inductor cycling switch to turn said transistor on and off to cyclically energize said inductor with current from the direct current source, producing pulses of charging current that are (1) steered entirely to said first charge storing device through said steering diode when said controlled steering switch is controlled to said off state, and (2) steered entirely to said second charge storage device though said controlled steering switch when said controlled steering switch is controlled to said on state; and a control circuit connected to said inductor cycling switch and responsive to actual output voltages of the first and second charge storing devices for (1) disabling the inductor cycling switch when the actual output voltages of the first and second charge storing devices are above the respective first and second predetermined voltages, and (2) otherwise controlling the state of the controlled steering switch so as to bring the actual output voltages of the first and second charge storing devices into correspondence with the respective first and second predetermined voltages.

2. The voltage boost circuit of claim 1 wherein said control circuit includes a dual state switch effective when enabled for alternately controlling the controlled steering switch to said off and on states so as that the pulses of charging current from said inductor are alternately steered to said first charge storing device and said second charge storing device.

3. A dual output voltage boost circuit connected to a direct current source having a predetermined input voltage, comprising:

means including an inductor for inducing a current;

cycling means coupled to said current inducing means for cyclically energizing said inductor with energizing current from said direct current source to produce an induced current;

first means coupled to receive induced current from said inductor for providing a first output voltage having a first desired value;

second means coupled to said inductor through a controlled switch for receiving induced current from said inductor for providing a second output voltage having a second desired value which is lower than said first desired value; and control means connected to said cycling means for disabling the cycling means when the first and second output voltages are above respective first and second desired values, and otherwise controlling said controlled switch based on a measure of said first and second output voltages so as to bring the first and second output voltages into correspondence with the respective first and second desired values.

4. The voltage boost circuit of claim 3 wherein said control means includes dual state means coupled to said cycling means and to said controlled switch for causing the induced current from said inductor to alternate between said first means and said second means.

5. The voltage boost circuit of claim 1, wherein said transistor is controlled by said inductor cycling switch to turn said transistor on when the inductor current is below a predetermined minimum current threshold, and to turn said transistor off when the inductor current rises above a predetermined maximum current threshold.

6. The voltage boost circuit of claim 5, further comprising:

a dual state switch coupled to said inductor cycling switch for alternately controlling said steering switch to said on and off states during alternate cycles of said inductor cycling switch so that the pulses of charging current from said inductor alternate between said first charge storing device and said second charge storing device.

7. The voltage boost circuit of claim 3, wherein said cycling means initiates said energizing current when said induced current falls below a predetermined minimum current threshold, and to terminates said energizing current when such energizing current rises above a predetermined maximum current threshold.

8. The voltage boost circuit of claim 7, wherein:

said control means activates said controlled switch to a low impedance state during alternate cycles of said cycling means, thereby causing the induced current to alternate between said first means and said second means.

* * * * *